US006959324B1

(12) United States Patent
Kubik et al.

(10) Patent No.: US 6,959,324 B1
(45) Date of Patent: Oct. 25, 2005

(54) METHOD AND APPARATUS FOR ADDING DATA ATTRIBUTES TO E-MAIL MESSAGES TO ENHANCE THE ANALYSIS OF DELIVERY FAILURES

(75) Inventors: Joseph Kubik, Austin, TX (US); Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 885 days.

(21) Appl. No.: 09/671,059

(22) Filed: Sep. 28, 2000

(51) Int. Cl.[7] ............................................. G06F 13/00
(52) U.S. Cl. ..................... 709/206; 709/217; 709/224; 719/328
(58) Field of Search .............................. 709/204, 206, 709/207, 217, 218, 223, 224, 225; 719/311, 719/328, 329

(56) References Cited

U.S. PATENT DOCUMENTS

| | | | |
|---|---|---|---|
| 5,675,733 A | 10/1997 | Williams ................ | 395/200.01 |
| 5,715,393 A * | 2/1998 | Naugle ........................ | 709/224 |
| 5,841,982 A * | 11/1998 | Brouwer et al. ............ | 709/224 |
| 5,958,009 A | 9/1999 | Friedrich et al. ........... | 709/224 |
| 6,115,455 A * | 9/2000 | Picard ........................ | 379/67.1 |
| 6,393,465 B2 | 5/2002 | Leeds ......................... | 709/207 |
| 6,430,177 B1 * | 8/2002 | Luzeski et al. ............. | 370/356 |
| 6,434,601 B1 * | 8/2002 | Rollins ....................... | 709/206 |
| 6,557,036 B1 * | 4/2003 | Kavacheri et al. .......... | 709/224 |
| 6,584,466 B1 * | 6/2003 | Serbinis et al. ............. | 707/10 |
| 6,615,262 B2 | 9/2003 | Schweitzer et al. ......... | 709/224 |
| 6,618,749 B1 * | 9/2003 | Saito et al. ................. | 709/207 |
| 6,650,440 B1 * | 11/2003 | Wing ......................... | 358/402 |
| 6,654,789 B1 | 11/2003 | Bliss et al. ................. | 709/206 |
| 6,691,156 B1 * | 2/2004 | Drummond et al. ........ | 709/206 |
| 6,691,158 B1 * | 2/2004 | Douvikas et al. .......... | 709/219 |
| 6,775,691 B1 * | 8/2004 | Kubik et al. ............... | 709/206 |

OTHER PUBLICATIONS

U.S. Appl. No. 09/671,060, filed Sep. 28, 2000, Kubik et al., Method and Apparatus for Controlling Dead E-Mail Adress Scanning Discovery, Status Retries, and Other Metrics to Enforce E-Mail Quality of Service.

* cited by examiner

*Primary Examiner*—Viet D. Vu
(74) *Attorney, Agent, or Firm*—Duke W. Yee; David A. Mims, Jr.; Gerald H. Glanzman

(57) ABSTRACT

A dead e-mail identification locator discovers dead e-mail addresses without forwarding messages to valid recipients. Existing headers in the mail protocol are extended to include a test header. A mail server that supports the protocol extension of the present invention may send a reply if the address does not exist and may discard the message if the address does exist. The test header allows a sender to test an e-mail address for validity without the message being forwarded to the user, as will be described below. The sender may be a dead e-mail locator program, which tests a plurality of e-mail addresses. The sender and recipient mail servers may include attributes in the test header to enhance the analysis of delivery failures. Using these attributes, the dead e-mail address locator can pinpoint the location of e-mail message delivery failure and profile the performance of routing of messages and other details hidden from users.

15 Claims, 8 Drawing Sheets

METHOD AND APPARATUS FOR ADDING DATA ATTRIBUTES TO E-MAIL MESSAGES TO ENHANCE THE ANALYSIS OF DELIVERY FAILURES

BACKGROUND OF THE INVENTION

1. Technical Field

The present invention relates to an improved data processing system and, in particular, to a method and apparatus for locating dead e-mail identifications.

2. Description of Related Art

Electronic mail (e-mail) provides the transmission of messages over a network. An e-mail system requires a messaging system, which provides a store and forward capability, and a mail program that provides a user interface with send and receive functions.

Simple mail transfer protocol (SMTP) is the standard e-mail protocol on the Internet. It is a transmission control protocol/Internet protocol (TCP/IP) that defines a message format and a message transfer agent (MTA), which stores and forwards the mail. SMTP was originally designed for only text; however, multipurpose Internet mail extensions (MIME) and other encoding methods enable files, such as programs and multimedia content, to be attached to e-mail messages.

SMTP servers route SMTP messages throughout the Internet to a mail server. A disadvantage with prior art SMTP servers and mail servers is that they do not provide a convenient, non-invasive way to determine whether or not an e-mail address is valid. A person or enterprise may wish to validate an e-mail address for several reasons. For example, a company may distribute promotional materials to an e-mail list. Many of the addresses on the list may be invalid due to the owners changing Internet providers or canceling e-mail or Internet service. The sender then may receive return messages indicating that an error has occurred due to invalid addresses.

The only way to validate an address using the prior art systems is to send a message to the mail server and wait for a "no-reply" message from the destination mail server to indicate that the e-mail address or identification no longer exists. A side effect of this procedure is that, if the e-mail address is valid, the user receives a message. Typically, the message includes instructions to ignore the message or to reply to the message to continue to receive e-mail notices or to be removed from an e-mail list.

In addition, a company cannot provide metrics about its quality of service (QOS) that are used in service-based contracts in which e-mail servers are maintained.

Therefore, it would be advantageous to have a method and apparatus for adding attributes to e-mail messages to enhance analysis of delivery failures.

SUMMARY OF THE INVENTION

The present invention enables servers to send dummy e-mail messages to one another in order to receive status of e-mail identifications. The protocol layer is extended to include a user field to indicate that the message is not to be forwarded to the owner of the e-mail identification. A mail server that is not modified to support the field remains unaffected, while a mail server that supports the protocol extension sends a reply if the identification does not exist and discards the message if the identification does exist. The present invention adds generic attributes that are exchanged via e-mail messages and are not viewed by the senders or receivers of the messages.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
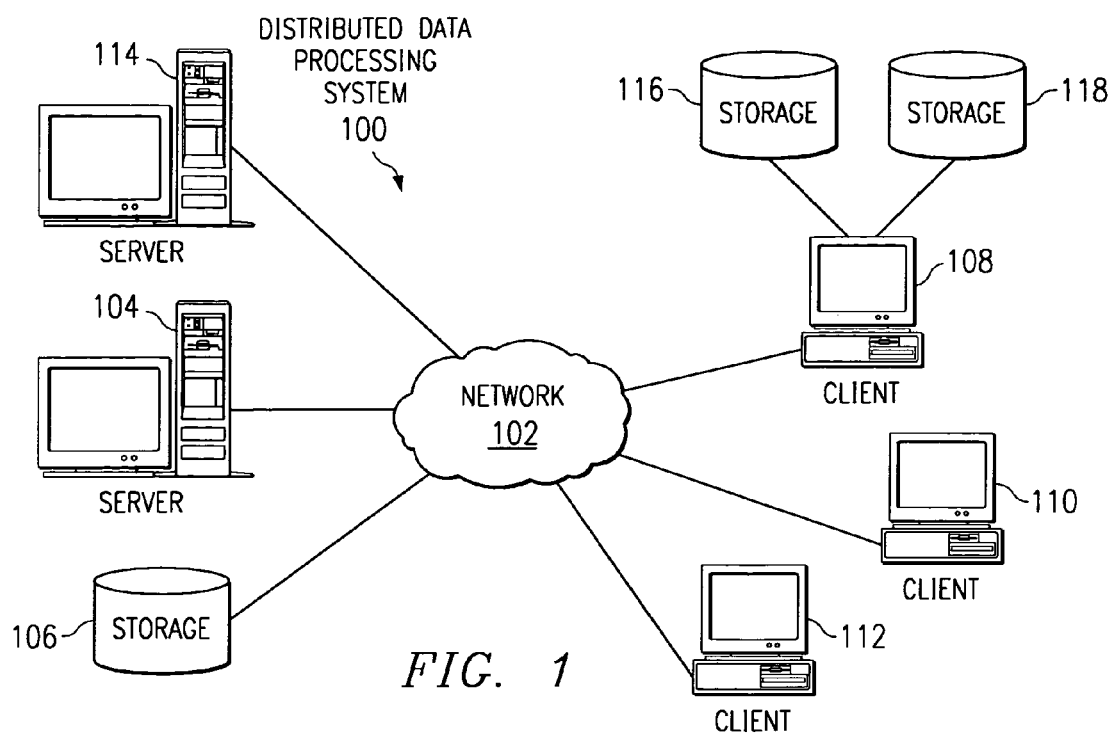
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, servers 104, 114 are connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, servers 104, 114 provide data, such as boot files, operating system images, and applications to clients 108–112. According to a preferred embodiment of the present invention, servers 104, 114 are e-mail servers. Clients 108, 110, and 112 are clients to server 104. In particular, client 108 may be connected to storage units 116, 118 for storage of database files. Distributed data processing system 100 may include additional servers, clients, and other devices not shown.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
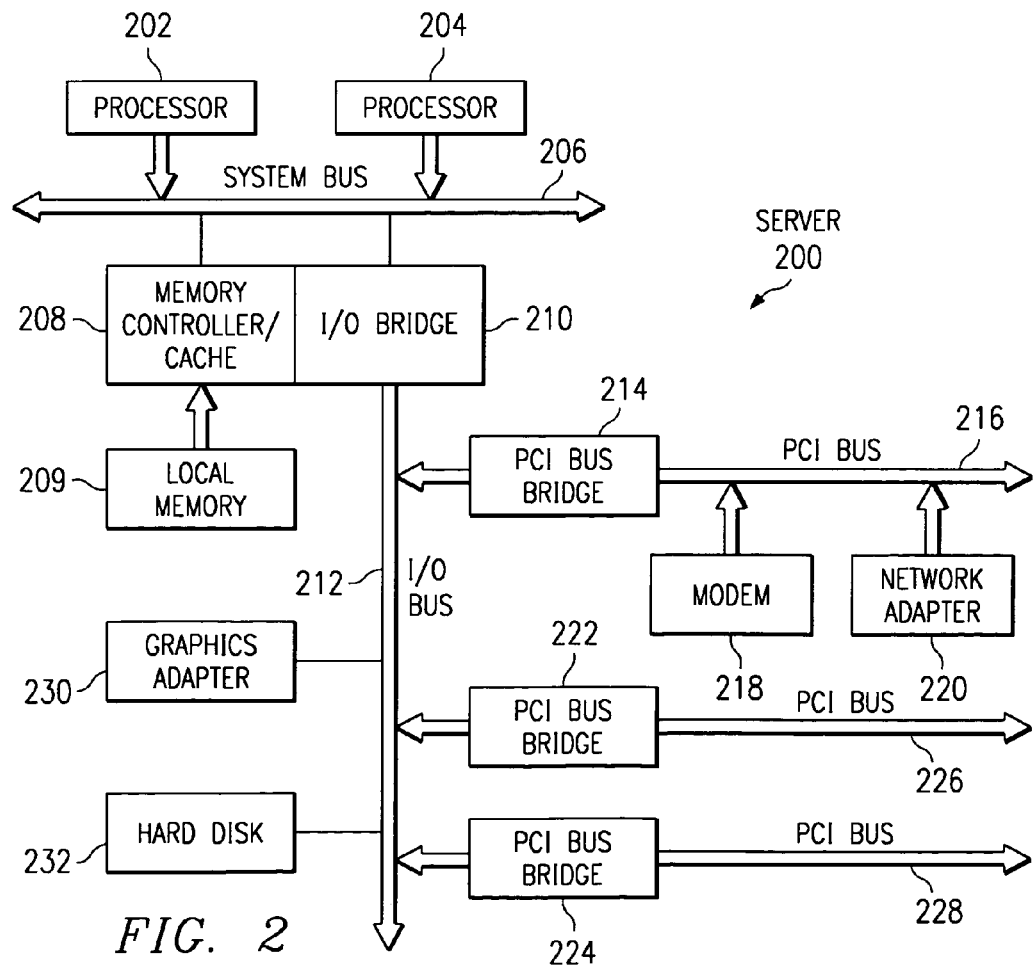
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

An operating system runs on processor 202 and is used to coordinate and provide control of various components within data processing system 200 in FIG. 2. The operating system may be a commercially available operating system, such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 232, and may be loaded into main memory 209 for execution by processor 202.

Figure 3:
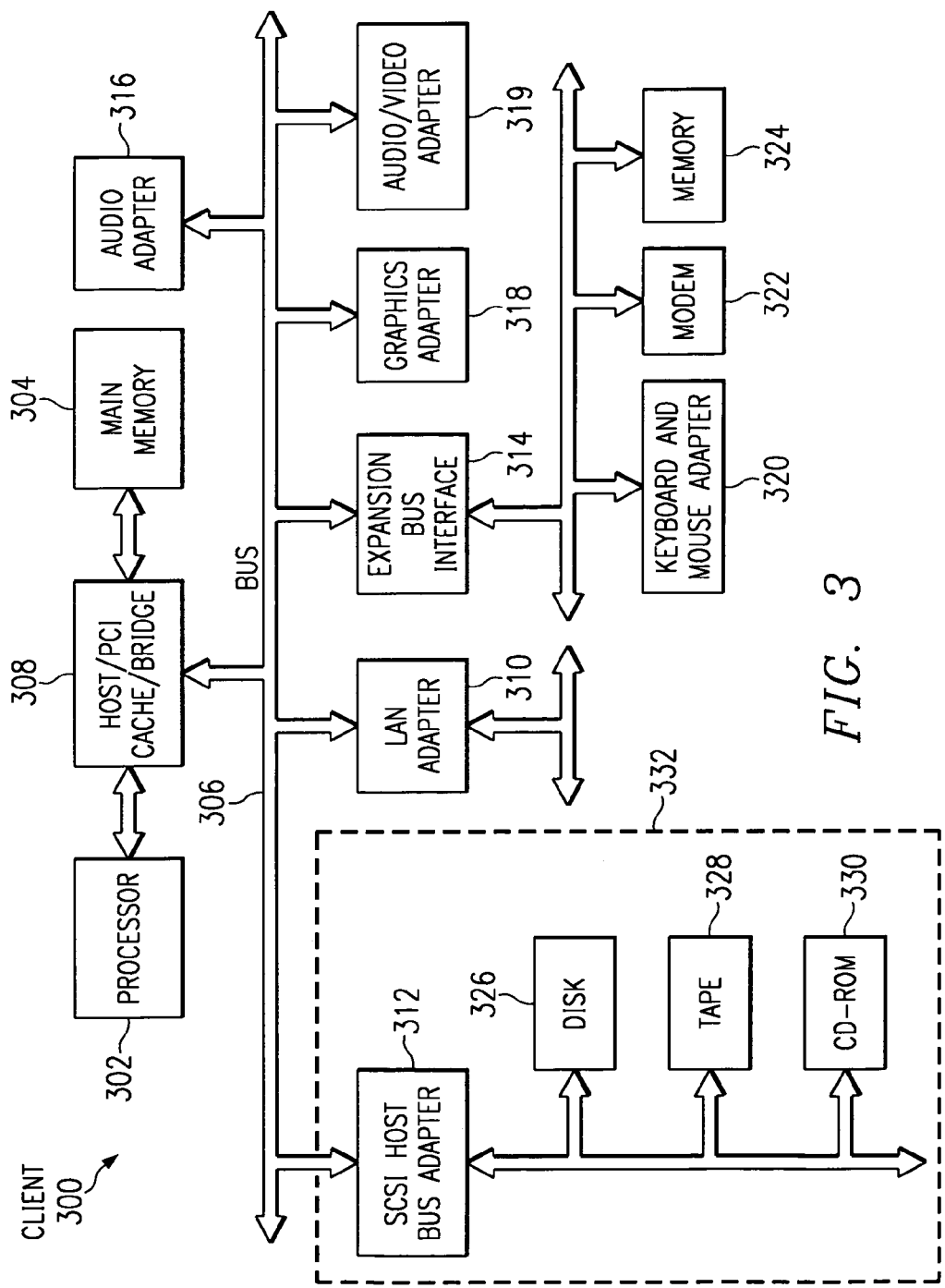
FIG. 3 is a block diagram illustrating a data processing system that may be implemented as a client in accordance with a preferred embodiment of the present invention.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
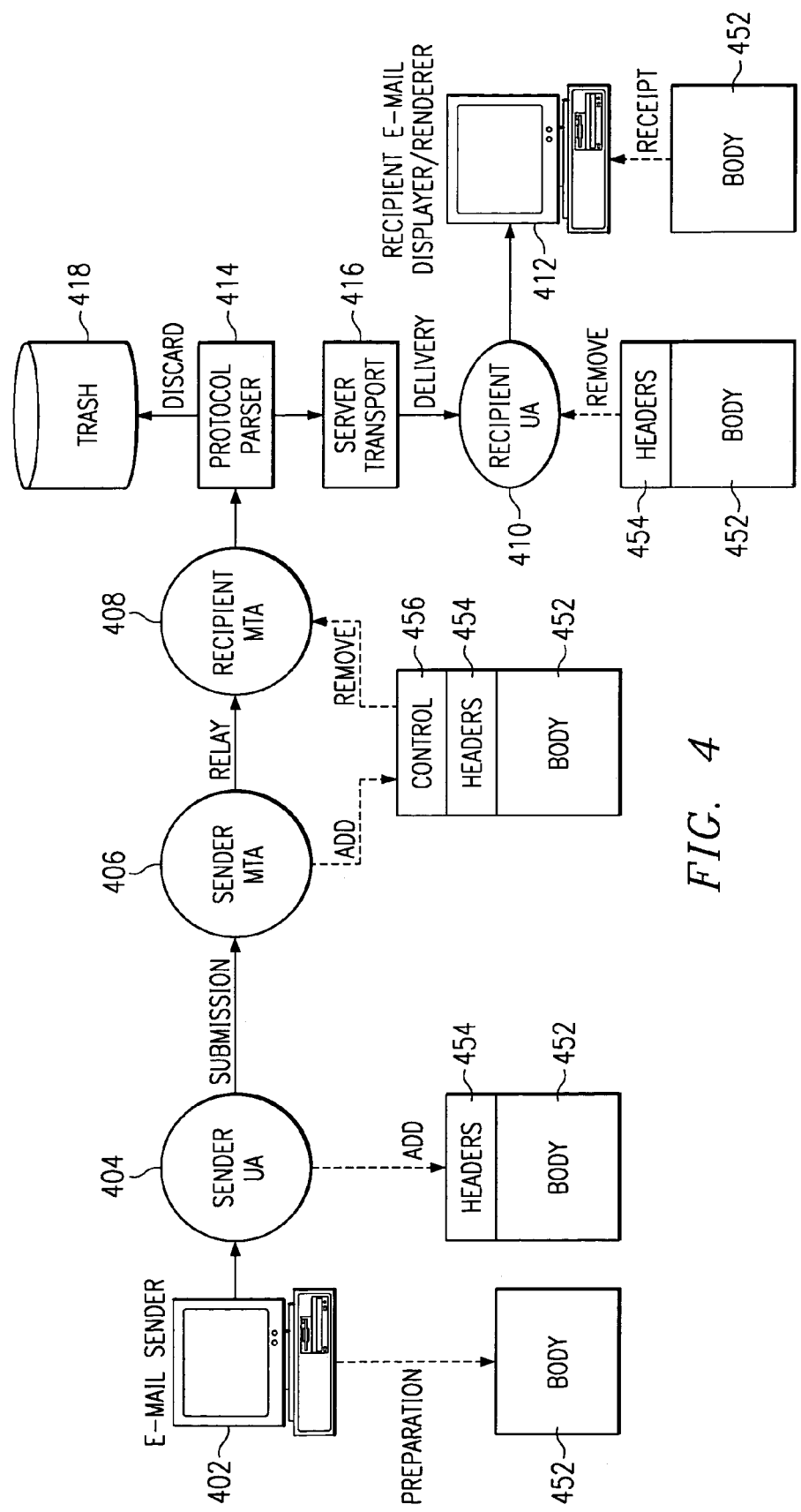
FIG. 4 is a data flow diagram illustrating e-mail delivery according to a preferred embodiment of the present invention.

With reference now to FIG. 4, a data flow diagram is shown illustrating e-mail delivery according to a preferred embodiment of the present invention. An e-mail sender computer 402 prepares the body 452 of an e-mail message. The message is sent to the sender user agent 404. The user agent (UA) is software, which acts on behalf of the user. In this case, the user is the sender of an e-mail message. A user agent may reside on a client computer, such as client 108 in FIG. 1, as part of an e-mail program. However, in the case of web-based e-mail systems, the user agent may reside on a server, such as server 104 in FIG. 1.

The user agent adds headers 454 to the e-mail message. The headers contain qualifying information, such as recipient, subject, and priority information. According to a preferred embodiment of the present invention, the existing headers, such as "Return-Path," "Received," "Date," "From," "Subject," "Sender," "To," "cc" (carbon copy), etc., are extended to include a test header, "EmailExistenceTestHeader," using a mechanism such as a "User-defined-field." The user agent or, alternatively, a helper application, will add the test header as part of headers 454.

The test header allows a sender to test an e-mail address for validity without the message being forwarded to the user, as will be described below. For example, an administrator may wish to test a list of e-mail servers and accounts that are presumed to be operational. Thus, if a response is received indicating that the server or account is invalid, then the server or account is down or "dead." In the example shown in FIG. 4, the e-mail sender 402 is the tester.

The sender UA 404 submits the message to a sender message transfer agent (MTA) 406. The MTA is software, which validates the submission and performs housekeeping functions, such as recording submission time and generating a message identifier. A message transfer agent typically resides on a server computer, such as servers 104, 114 in FIG. 1. The sender MTA adds control information 456 to the message. The control information may include the source and destination addresses, as well as any other control information needed for relaying the message through the network. In the X.400 e-mail protocol, the control information is referred to as an "envelope."

According to a preferred embodiment of the present invention, the sender MTA also fills in the test header with a DeadEmailTesterAddress, a DoNotSend flag, and a session identifier. The DeadEmailTesterAddress is the address of the tester in "canonicalized" fully qualified principal names or domain literals. The tester address is used to send a message to the server hosting the tester indicating that no e-mail account exists for the recipient. The server may be a different server than the e-mail server. The tester address field is added by the final transport system that is intended to contain definitive information about the address and route back to the tester. The DoNotSend flag is used to instruct the user agent to not forward the message to the user's e-mail account. The DoNotSend flag may be part of an optional field in standard mail headers or contained in existing fields. The tester uses the session identifier to determine which request for information the message represents. For example, the message may represent user, mail server, first attempt, second attempt, etc.

In a preferred embodiment of the present invention, the sender is a dead e-mail locator program, which is used to test e-mail addresses. For example, an e-mail service provider may wish to periodically test addresses, which are known to be valid to uncover potential problems.

The dead e-mail locator program may communicate with a helper application, which generates the test header. Therefore, the dead e-mail locator program submits the message to the MTA as if a user agent submitted the message. This allows an e-mail server to test its own addresses without using a network.

The present invention includes an extension in which the user agent is emulated in order to interrogate as to why a regular message was not sent/received. In this case, the existing mail fields are left untouched and the other fields are used as described herein to indicate that a message has been received. The user agent that receives an error message will automatically format the correct header with the tester's address and forward the failing message to the dead e-mail locator.

The sender MTA 406 relays the message to a recipient MTA 408, which validates the message and removes control information 456. Once the message is received, a protocol parser 414 parses the message and forwards the message to server transport 416 for delivery. The server transport delivers the message to recipient UA 410, which removes headers 454. Recipient e-mail displayer/renderer 412 presents the message to the recipient. If, however, the protocol parser discovers the test header and the DoNotSendFlag is set, then the message is discarded without being forwarded to the recipient. If a history is being kept, then the messages are discarded into trash 418, which may be a temporary cache, so that life of the message may be defined. Also, the last good message could be saved in order to determine when the last poll was done upon a failure of an e-mail address.

Figure 5:
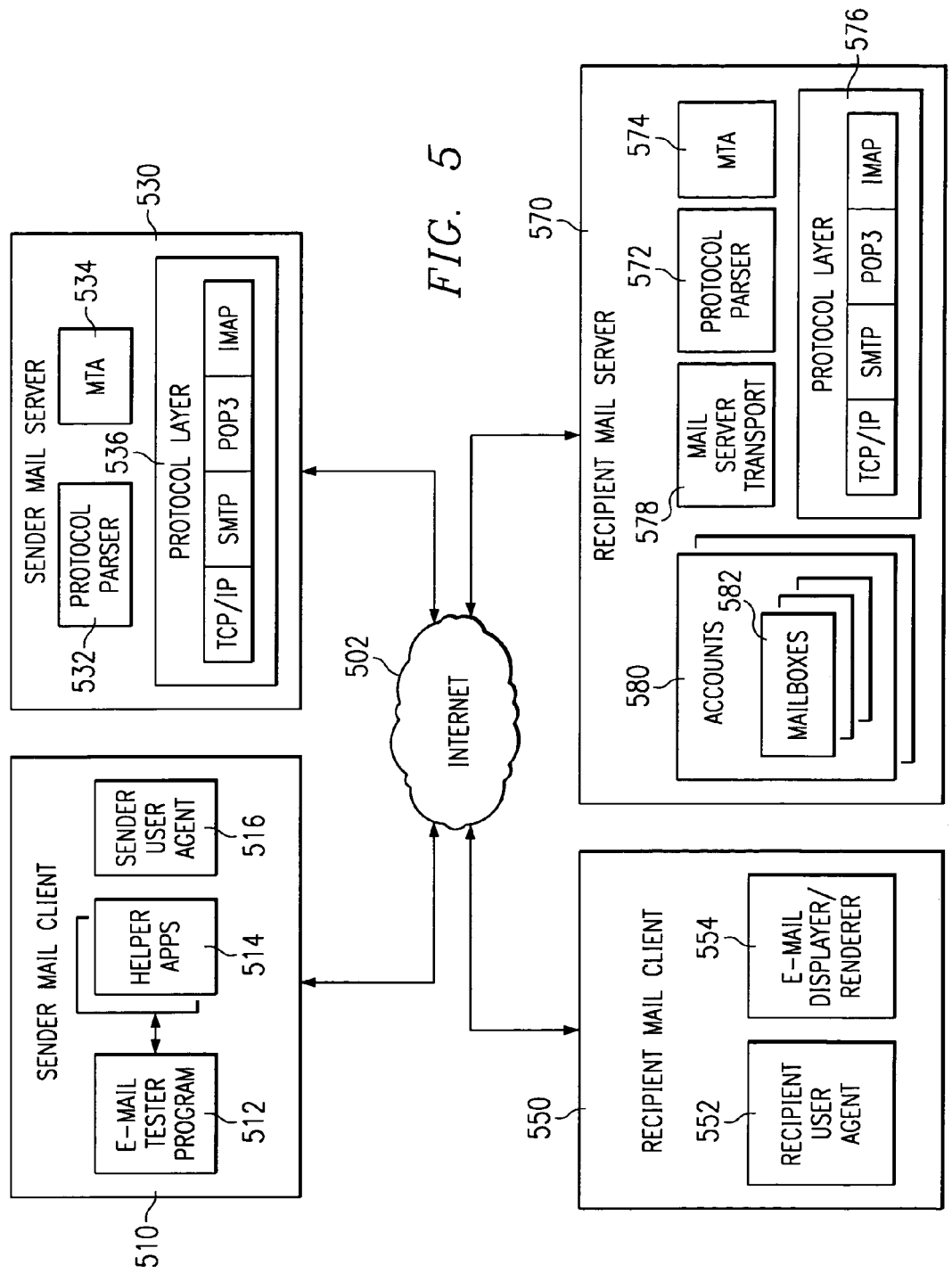
FIG. 5 is a pictorial representation of a network e-mail system according to a preferred embodiment of the present invention.

With reference now to FIG. 5, a pictorial representation of a network e-mail system is shown in accordance with a preferred embodiment of the present invention. Sender mail client 510, sender mail server 530, recipient user client 550, and recipient mail server 570 are connected to Internet 502. Sender mail client 510 includes an e-mail tester program 512, which tests e-mail addresses to determine whether addresses are valid or invalid. The e-mail tester program may communicate with helper applications 514, which manage the test header. The sender mail client also includes sender user agent 516. The sender mail client may be embodied as client 108 in FIG. 1. Sender user agent may be sender UA 404 in FIG. 4.

Sender mail server 530 includes a protocol parser 532, a message transfer agent 534, and a protocol layer 536. The sender mail server may be embodied as one of servers 104, 114 in FIG. 1. Mail transfer agent 534 may be sender MTA 406 in FIG. 4. The protocol layer includes TCP/IP, SMTP, post office protocol 3 (POP3), and Internet messaging access protocol (IMAP). POP3 is a standard mail server commonly used on the Internet. A POP3 server provides a message store that holds incoming e-mail messages until users log onto the server and download them. POP3 uses the SMTP messaging protocol. IMAP is a standard mail server similar to POP3. However, IMAP is more sophisticated than the POP3 mail server. Sender mail client 510 sends e-mail messages to sender mail server 530 to be relayed to the appropriate recipient mail server.

Recipient mail client 550 includes recipient user agent 552 and e-mail displayer/renderer 554. The recipient mail client may be embodied as one of clients 110, 112 in FIG. 1. The recipient user agent receives messages from a recipient mail server for presentation to the user. The recipient user agent may be recipient UA 410 in FIG. 4. The e-mail displayer/renderer presents received messages on the user's client platform.

Recipient mail server 570 includes protocol parser 572, message transfer agent 574, and protocol layer 576 in a manner similar to sender mail server 530. The recipient mail server also includes mail server transport 758 and accounts 580, one for each user who receives messages through server 570. Each account may include one or more mailboxes 582 in which messages may be stored. The recipient mail server may be embodied as one of servers 104, 114 in FIG. 1. The message transfer agent may be recipient MTA 408 in FIG. 4.

Sender mail server 530 and receiver mail server 570 set attributes in the message header to enhance the analysis of mail delivery problems. The attributes in the message header may be as set forth below.

```
//classes
EmailAttributeData        {
    //Methods
    void RegisterAttribute (string DataAttributeName);
    string GetAttribute (string AttributeName);
    void SetAttribute (string AttributeName, string
            AttributeValue);
    string[ ] GetAllEmailDataAttributes ( );
    //Constructor
    EmailAttributeData (EmailMessage Message);
    EmailMessage        //Only has Control and Header
    string Header;
    string Control;
```

The above example attributes are for illustration. Other attributes and classes may be used. The classes are used by parsers 532, 572 to store the attributes in an attribute database. The attributes may be obtained using the underlying operating system or Java virtual machine (JVM) in a known manner.

Figure 6:
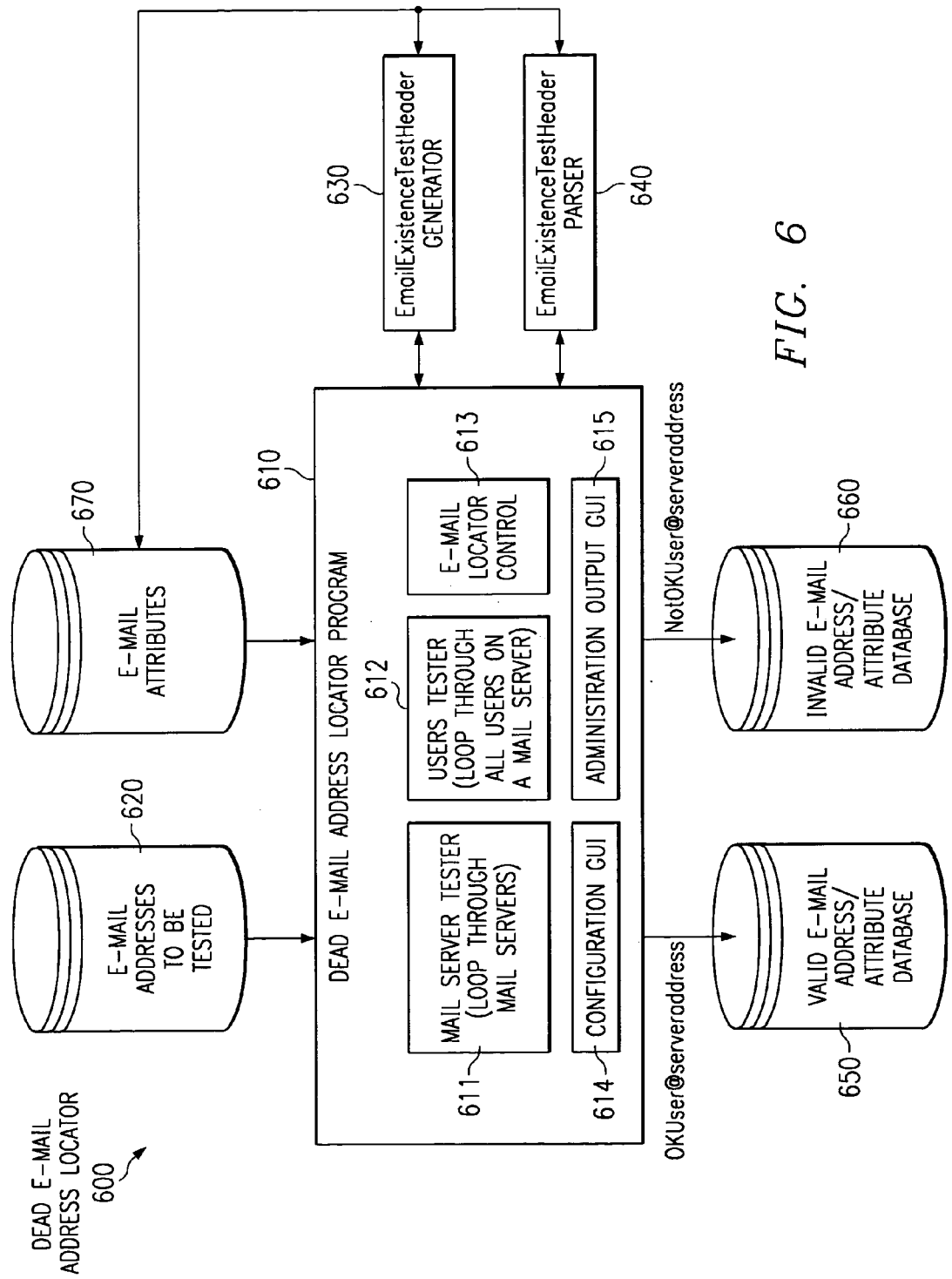
FIG. 6 is a block diagram of a dead e-mail address locator according to a preferred embodiment of the present invention.

As discussed above, in a preferred embodiment of the present invention, the sender is a dead e-mail locator program, which is used to test e-mail addresses. With reference now to FIG. 6, a block diagram of a dead e-mail address locator is shown in accordance with a preferred embodiment of the present invention. The dead e-mail address locator 600 includes a dead e-mail address locator program 610, which receives e-mail addresses to be tested from a database 620. The operation of dead e-mail address locator program 610 is described in detail below with respect to FIGS. 9A and 9B. Locator program 610 communicates with two helper applications, namely test header generator 630 and test header parser 640. The test header generator adds the test header to e-mail messages. The test header parser edits keyword entries in the message and helps the receiver determine if the message is a tester message.

When the dead e-mail address locator program receives information indicating that an address is valid, the e-mail address is stored in a valid e-mail address/attribute database 650. When the locator program receives information indicating that an address is invalid, the address is stored in an invalid e-mail address/attribute database 660. Dead e-mail address locator program 610 includes an e-mail locator control 613, which contains instructions for controlling operation of the program. The locator program also includes mail server tester 611, which loops through the mail servers of the addresses in database 620. When the locator program discovers a valid mail server, users tester 612 loops through all users on the mail server.

The dead e-mail address locator program may also include configuration graphical user interface (GUI) 614 and administration output GUI 615. The configuration GUI provides an interface, which allows an administrator to enter control information for the operation of the dead e-mail address locator program. Configuration GUI 614 is discussed in more detail below with respect to FIG. 7. The administration output GUI provides an interface for presentation of the results of the dead e-mail address locator program. Administration output GUI 615 is discussed in more detail below with respect to FIG. 8.

In the depicted example, the dead e-mail address locator resides in a client, such as client 510 in FIG. 5. However, a person of ordinary skill in the art will recognize that the dead e-mail address locator may have other configurations. For example, the dead e-mail address locator may be embodied in a server, such as server 530 in FIG. 5. The dead e-mail address locator may also be embodied in a stand-alone system for off-line processing.

In addition, the valid e-mail address/attribute database 650 and invalid e-mail address/attribute database 660 may be connected to a network, such as network 102 in FIG. 1 or Internet 502 in FIG. 5, allowing several dead e-mail address locators to contribute to the databases and to allow the databases to be shared by a plurality of clients and servers through the network.

Furthermore, the dead e-mail address locator may test e-mail addresses as needed, rather than as a batch process. The dead e-mail address locator program may also receive the addresses from valid e-mail address/attribute database 650 or invalid e-mail address/attribute database 660 as input. The dead e-mail address locator program may use the results to update the databases. In these examples, the dead e-mail address locator may not include a database of e-mail addresses to be tested.

The test header parser extracts attributes from a message header in a reply message. Test header parser 640 may be embodied in a protocol parser, such as parser 532 in FIG. 5. The test header generator receives attributes for insertion in the header from e-mail address database 670. Once extracted from the message header, the attributes may be stored in the e-mail attributes database. The locator program may also store the attributes in databases 650, 660. The attributes may include the sender client IP address or name, the sender mail server IP address or name, the recipient mail client IP address or name, and the recipient mail server IP address or name. The attributes may also include, for example, the addresses or names of routers used by the sender and recipient mail servers.

Figure 7:
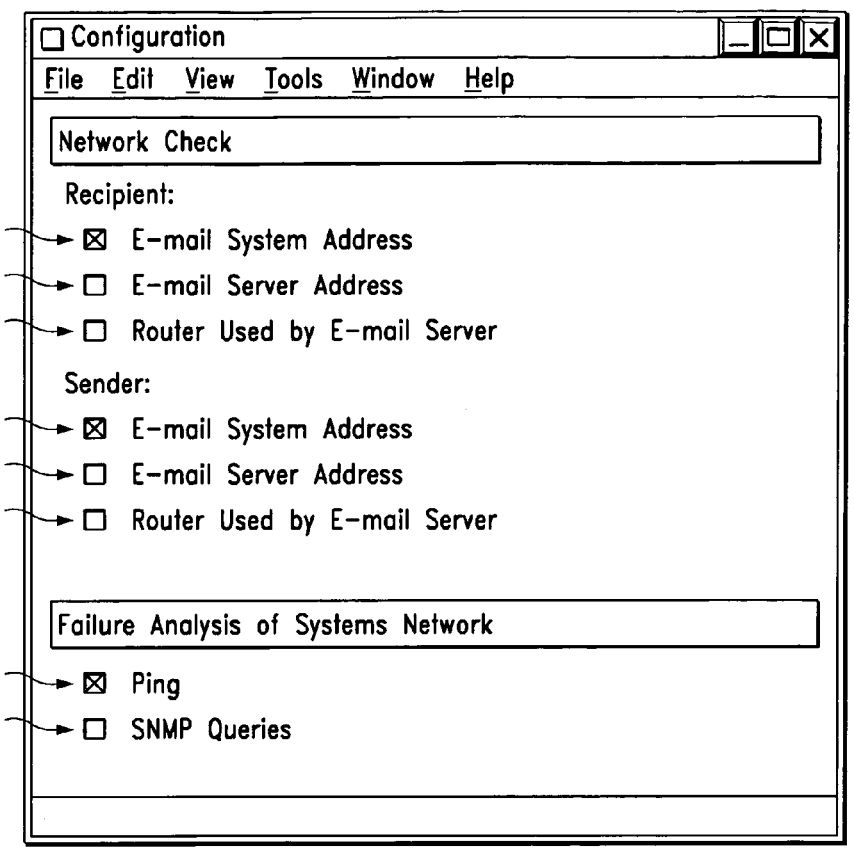
FIG. 7 is an exemplary screenshot of a configuration graphical user interface window in accordance with a preferred embodiment of the present invention.

Turning now to FIG. 7, an exemplary screenshot of a configuration graphical user interface window is shown in accordance with a preferred embodiment of the present invention. Configuration GUI window 700 includes a display area with a plurality of check boxes. The recipient e-mail system address check box 712 allows the administrator to indicate that the address or name of the recipient e-mail system or user agent is to be included in the test header. The recipient e-mail server address check box 714, when checked, indicates that the address or name of the recipient e-mail server is to be included in the test header. Check box 716, when checked, indicates that the address of a router used by the recipient e-mail server is to be included as an attribute in the test header. Similarly, checkboxes 722, 724, 726, when selected, indicate that the address or name of the sender e-mail system, the address or name of the sender e-mail server, and the address of a router used by the sender e-mail server are to be included in the test header, respectively. Addresses may be discovered using known methods, such as simple network management protocol (SNMP) queries. In an alternative embodiment, if a network is relatively small and the address are known, the addresses may be entered into a graphical user interface, such as the configuration GUI.

The configuration GUI window also includes a set of check boxes 732, 734, which indicate a failure analysis of systems network. If check box 732 is selected, the failure analysis is based on ping. If check box 734 is selected, the failure analysis is based on SNMP queries. Check boxes 732, 734 may be configured as radio buttons such that only one may be selected at a time.

Messages are typically not delivered due to the inability for one system to communicate with another system. Two standard TCP/IP protocols used in the industry to determine if one machine can talk to another machine are ping and SNMP. Regardless of the processor 202 type or network connections 102, a network administrator can initiate the sending of unique type of network data packet (ping or SNMP) to IP address of another machine and wait for a reply. The second machine receives this data packet and sends this same type of unique network data packet to the originating machine. This type of query—response between two machines—is commonly used to determine whether the IP stack is able to receive packets on a machine which indicates network connectivity is operational. If problems exist with these non-mail message protocols, then the mail protocols 536, which depend on network connectivity, will not function either.

Figure 8:
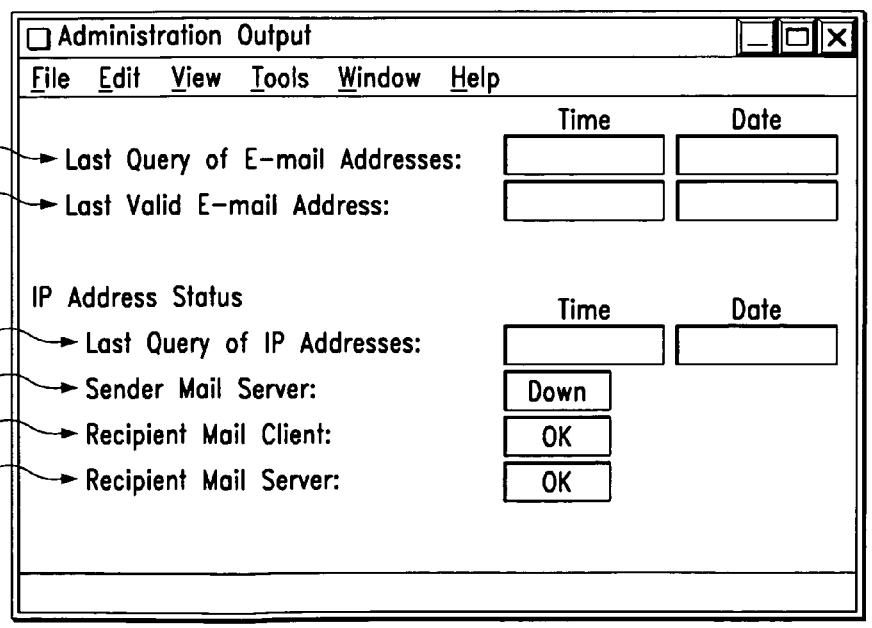
FIG. 8 is an exemplary screenshot of an administration output graphical user interface window in accordance with a preferred embodiment of the present invention.

Turning now to FIG. 8, an exemplary screenshot of an administration output graphical user interface window is shown in accordance with a preferred embodiment of the present invention. Administration output GUI window 800 includes a display area with a plurality of output fields. Last query of e-mail addresses fields 812 display the time and date of the last test of an email address. The last valid e-mail address fields 814 display the time and date of the last indication of a valid e-mail address.

Last query of IP addresses field 822 displays the time and date of the last IP address PING/SNMP status query which gives the Administrator an idea of recent the status was gathered. Sender mail server field 824 displays the status of the sender mail server. Recipient mail client field 826 displays the status of the recipient mail client. Recipient mail server field 828 displays the status of the recipient mail server.

Figure 9A:
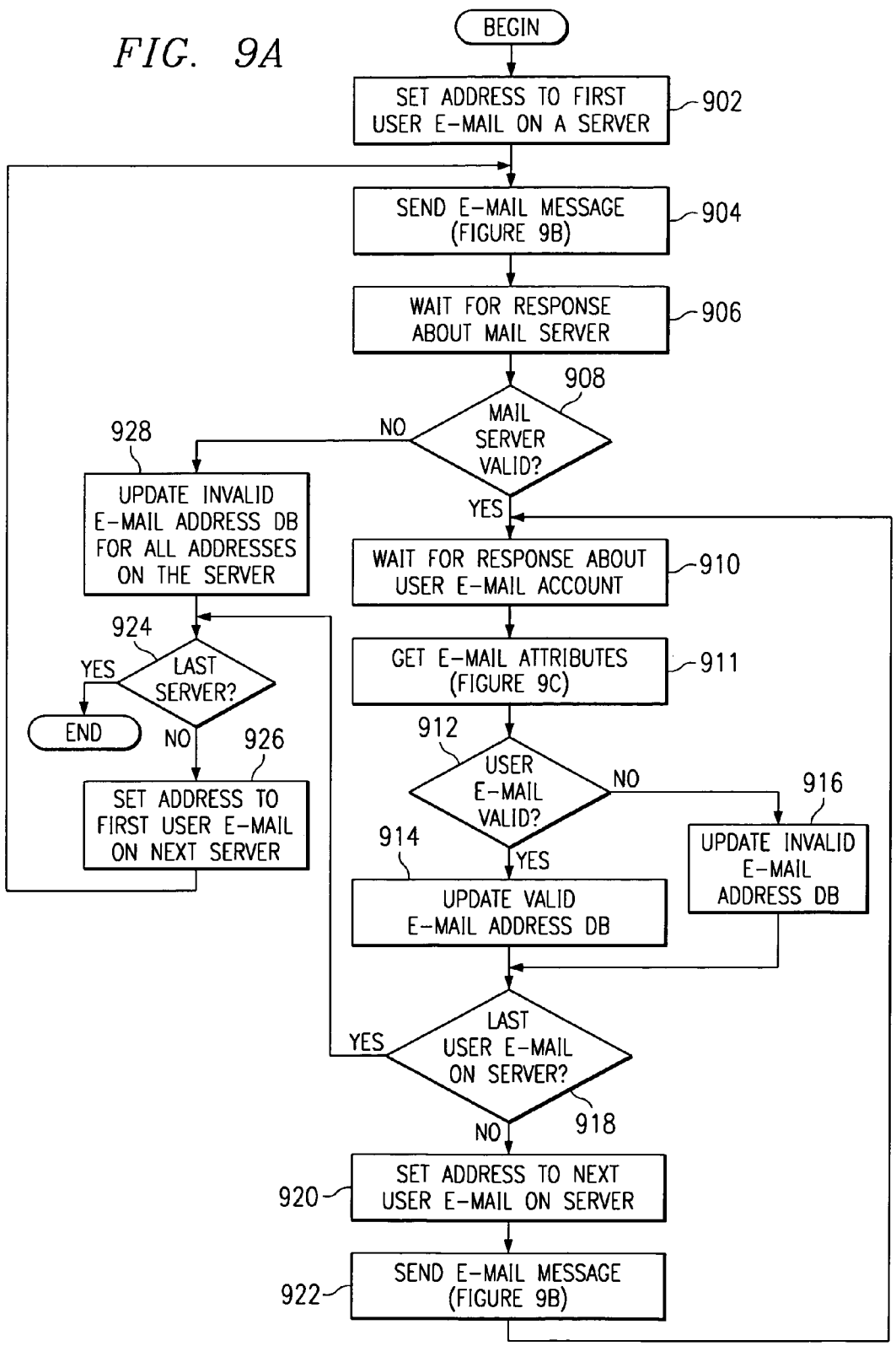
FIG. 9A is a flowchart illustrating a dead e-mail address locator process in accordance with a preferred embodiment of the present invention.

With reference now to FIG. 9A, a flowchart illustrating the dead e-mail address locator process 610 in FIG. 6 is shown in accordance with a preferred embodiment of the present invention. The process begins and sets an address to the first user e-mail on the first server (step 902). The process sends an e-mail message to the address (step 904). The operation of the process of sending an e-mail message in the dead e-mail address locator process is described in detail below with respect to FIG. 9B. Thereafter, the locator process waits for a response about the mail server (step 906).

A determination is made as to whether the mail server is valid (step 908). If the mail server is valid, the process waits for a response about the user e-mail account (step 910) and the process gets the e-mail attributes (step 911). The process of getting e-mail attributes is described in further detail below with respect to FIG. 9C.

A determination is made as to whether the user e-mail account is valid (step 912). The process updates the valid e-mail address database (914) if the account is valid and updates the invalid e-mail address database (916) if the account is invalid. Then, a determination is made as to whether the user e-mail address is the last address for the current server (step 918). When the dead e-mail address locator tests a plurality of addresses, several addresses may belong to a single server. The addresses to be tested are sorted by server. If the server is valid, the dead e-mail address locator tests the addresses for that server until the last address for that server has been tested, then begins testing the next server.

If the user e-mail address is not the last address for the current mail server, the process sets the address to the next user e-mail address on the server (step 920), sends the e-mail message (step 922), and returns to step 910 to wait for a response about the user e-mail account. Again, the operation of the process of sending an e-mail message in the dead e-mail address locator process is described in detail below with respect to FIG. 9B.

If the user e-mail address is the only address for the current server or is the last address for the current mail server in step 918, a determination is made as to whether the current server is the last server to be tested (step 924). If the server is the last server, the process ends. If, however, the server is not the last server in step 924, the process sets the address to the first user e-mail address on the next server (step 926) and returns to step 904 to send the e-mail message.

Returning to step 908, if the mail server being tested is not valid, the process updates the invalid address database for all addresses on the server (step 928) and proceeds to step 924 to determine whether the current server is the last server to be tested.

Figure 9B:
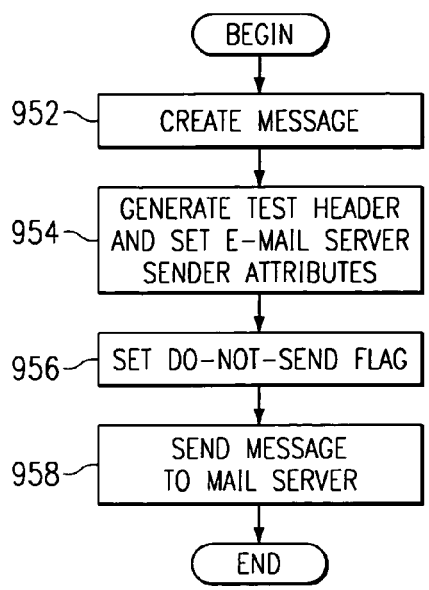
FIG. 9B is a flowchart illustrating the operation of the process of sending an e-mail message in the dead e-mail address locator process in accordance with a preferred embodiment of the present invention.

Turning now to FIG. 9B, a flowchart illustrating the operation of the process of sending an e-mail message in the dead e-mail address locator process is shown in accordance with a preferred embodiment of the present invention. The process begins and creates an e-mail message (step 952). Thereafter, the process generates a test header and sets the e-mail server sender attributes (step 954) and sets the DoNotSendFlag to "true" (step 956). Finally, the process sends the message to the mail server (step 958) and ends.

Figure 9C:
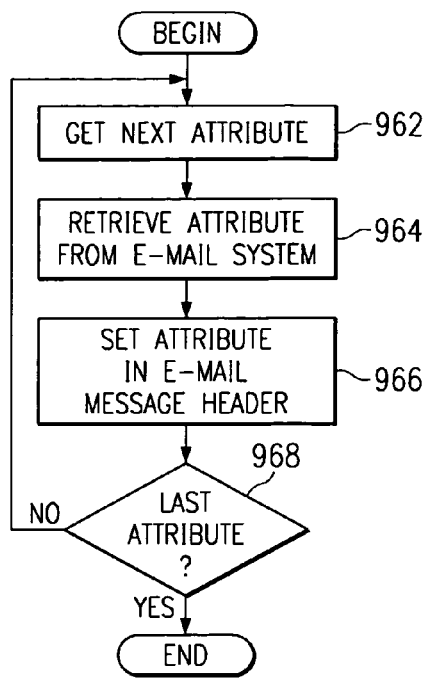
FIG. 9C is a flowchart illustrating the operation of a process of setting attributes in a message header in accordance with a preferred embodiment of the present invention.

Turning now to FIG. 9C, a flowchart is shown illustrating the operation of a process of setting attributes in a message header in accordance with a preferred embodiment of the present invention. The process begins, gets a first attribute (step 962), and retrieves the attribute from the e-mail system (step 964). Then, the process sets the attribute in the e-mail message header (step 966) and a determination is made as to whether the attribute is the last attribute (step 968). If the attribute is the last attribute, the process ends. If the attribute is not the last attribute in step 968, the process returns to step 962 to get the next attribute.

Figure 10:
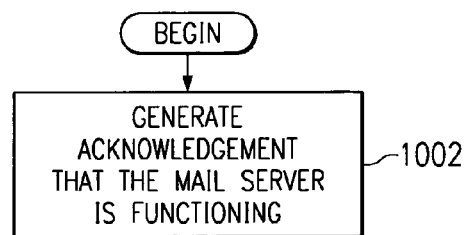
FIG. 10 is a flowchart illustrating the operation of a process of a mail server in accordance with a preferred embodiment of the present invention.
Figure 10:
Figure 10:
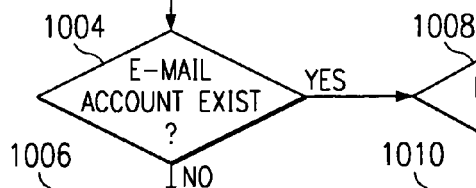
Figure 10:
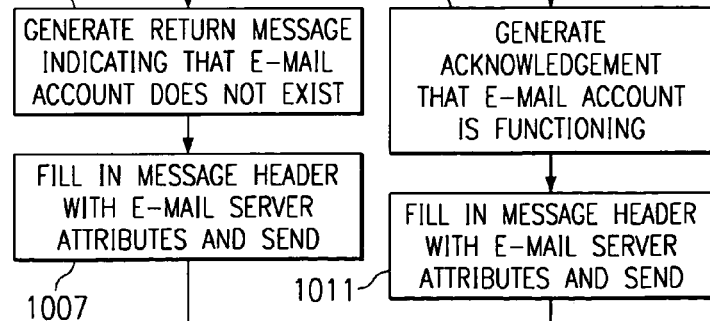
Figure 10:
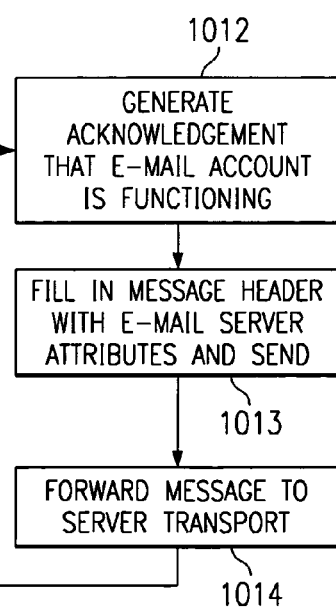

As stated above, a mail server that supports the protocol extension of the present invention sends a reply if the address does not exist and discards the message if the address does exist. With reference now to FIG. 10, a flowchart is shown illustrating the operation of a process of a mail server in accordance with a preferred embodiment of the present invention. The process begins and generates an acknowledgment to the tester address that the mail server is functioning (step 1002). Next, the process fills in the message header with the e-mail server attributes and sends the acknowledgment (step 1003) and a determination is made as to whether the e-mail account exists (step 1004). If the e-mail account does not exist, the process generates a return message indicating that the e-mail account does not exist (step 1006), fills in the message header with the e-mail server attributes and sends the return message (step 1007), and ends. If the e-mail account does exist in step 1004, a determination is made as to whether the DoNotSend flag is set to "true" (step 1008).

If the DoNotSend flag is set to "true," the process generates an acknowledgment to the tester address that the e-mail account is functioning (step 1010), fills in the message header with the e-mail server attributes and sends the acknowledgment (step 1011), and ends. The message is then discarded. If the DoNotSend flag is set to "false" in step 1008, the process generates an acknowledgment to the tester address that the e-mail account is functioning (step 1012) and fills in the message header with the e-mail server attributes and sends the acknowledgment (step 1013). The process then forwards the message to the mail server transport (step 1014) for delivery to the user and ends.

Thus the present invention provides a system and method for locating dead e-mail addresses without forwarding a message to valid recipients. Existing headers in the mail protocol are extended to include a test header. The user agent or, alternatively, a helper application, will add the test header. A mail server that supports the protocol extension of the present invention may send a reply if the address does not exist and may discard the message if the address does exist. The test header allows a sender to test an e-mail address for validity without the message being forwarded to the user, as will be described below. In a preferred embodiment of the present invention, the sender may be a dead e-mail locator program, which tests a plurality of e-mail addresses. The sender and recipient mail servers may include attributes in the test header to enhance the analysis of delivery failures. Using these attributes, the dead e-mail address locator can pinpoint the location of e-mail message delivery failure and profile the performance of routing of messages and other details hidden from users.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
   creating an electronic message having a recipient at an address on a server, wherein the electronic message includes at least one delivery attribute identifier for identifying at least one delivery attribute;
   sending the electronic message to the recipient;
   receiving a response, the response including validity information indicating whether that the address is an invalid address, and at least one delivery attribute value corresponding to the at least one delivery attribute, the at least one delivery attribute value including delivery information regarding the electronic message;
   processing the at least one delivery attribute value to form delivery failure analysis information; and
   presenting the delivery failure analysis information,
   wherein the step of processing the at least one delivery attribute value comprises one of pinging the address and performing a simple network monitoring query for the address.

2. The method of claim 1, wherein the at least one delivery attribute identifier comprises at least one of a recipient mail system identifier, a recipient mail server identifier, a recipient router identifier, a sender mail system identifier, a sender mail server identifier, and a sender router identifier.

3. The method of claim 1, wherein the at least one delivery attribute value includes an address, the address comprising one of a recipient mail system address, a recipient mail server address, a recipient router address, a sender mail system address, a sender mail server address, and a sender router address.

4. The method of claim 1, further comprising: storing the at least one delivery attribute value in a storage.

5. The method of claim 4, wherein the storage is a database.

6. The method of claim 1, wherein the method is performed by a client.

7. The method of claim 1, wherein the method is performed by a server.

8. An apparatus comprising:
   creation means for creating an electronic message having a recipient at an address on a server, wherein the electronic message includes at least one delivery attribute identifier for identifying at least one delivery attribute;
   sending means for sending the electronic message to the recipient;
   receipt means for receiving a response, the response including validity information indicating that the address is an invalid address, and at least one delivery attribute value corresponding to the at least one delivery attribute, the at least one delivery attribute value including delivery information regarding the electronic message;

processing means for processing the at least one delivery attribute value to form delivery failure analysis information; and presentation means for presenting the delivery failure analysis information, wherein the processing means comprises one of means for pinging the address and means for performing a simple network monitoring query for the address.

9. The apparatus of claim 8, wherein the at least one delivery attribute identifier comprises at least one of a recipient mail system identifier, a recipient mail server identifier, a recipient router identifier, a sender mail system identifier, a sender mail server identifier, and a sender router identifier.

10. The apparatus of claim 8, wherein the at least one delivery attribute value includes an address, the address being one of a recipient mail system address, a recipient mail server address, a recipient router address, a sender mail system address, a sender mail server address, and a sender router address.

11. The apparatus of claim 8, further comprising:
storage means for storing the at least one delivery attribute value.

12. The apparatus of claim 11, wherein the storage means comprises a database.

13. The apparatus of claim 8, wherein the apparatus is embodied in a client computer.

14. The apparatus of claim 8, wherein the apparatus is embodied in a server computer.

15. A computer program product, in a computer readable medium, comprising:

instructions for creating an electronic message having a recipient at an address on a server, wherein the electronic message includes at least one delivery attribute identifier for identifying at least one delivery attribute;

instructions for sending the electronic message to the recipient;

instructions for receiving a response, the response including validity information indicating that the address is an invalid address, and at least one delivery attribute value corresponding to the at least one delivery attribute, the at least one delivery attribute value including delivery information regarding the electronic message;

instructions for processing the at least one delivery attribute value to form delivery failure analysis information; and instructions for presenting the delivery failure analysis information, wherein the instructions for processing the at least one delivery attribute value comprises one of instructions for pinging the address and instructions for performing a simple network monitoring query for the address.

* * * * *